(12) United States Patent  (10) Patent No.: US 7,995,030 B2
Joung et al.  (45) Date of Patent: Aug. 9, 2011

(54) APPARATUS AND METHOD FOR SEARCHING AND DISPLAYING DATA (75) Inventors: Chul-Yong Joung, Seoul (KR); Bang-Won Lee, Yongin-si (KR)

(73) Assignee: Atlab Inc. (KR)

( * ) Notice: Subject to any disclaimer, the term of this patent is extended or adjusted under 35 U.S.C. 154(b) by 1046 days.

(21) Appl. No.: 11/814,505

(22) PCT Filed: Jan. 19, 2006

(86) PCT No.: PCT/KR2006/000218
§ 371 (c)(1),
(2), (4) Date: Jul. 23, 2007

(87) PCT Pub. No.: WO2006/080787
PCT Pub. Date: Aug. 3, 2006

(65) Prior Publication Data
US 2009/0120268 A1  May 14, 2009

(30) Foreign Application Priority Data
Jan. 27, 2005 (KR) .......................... 10-2005-0007742

(51) Int. Cl.
*G09G 5/00* (2006.01)
(52) U.S. Cl. ....................................................... 345/156
(58) Field of Classification Search .................. 345/156; 84/609; 715/784
See application file for complete search history.

(56) References Cited

U.S. PATENT DOCUMENTS
| | | | |
|---|---|---|---|
| 4,899,138 A | 2/1990 | Araki et al. | |
| 6,034,688 A * | 3/2000 | Greenwood et al. | 715/784 |
| 6,757,002 B1 | 6/2004 | Oross et al. | |
| 6,879,316 B2 * | 4/2005 | Kehlstadt et al. | 345/163 |
| 7,046,230 B2 * | 5/2006 | Zadesky et al. | 345/156 |

FOREIGN PATENT DOCUMENTS
| | | |
|---|---|---|
| JP | 63-078222 | 4/1988 |
| JP | 63-285588 | 11/1988 |
| JP | 06035400 | 2/1994 |
| JP | 06-180661 | 6/1994 |
| JP | 08-096295 | 4/1996 |

(Continued)

OTHER PUBLICATIONS apple.com, iPod user's guide, 2002.

(Continued)

*Primary Examiner* — Quan-Zhen Wang
*Assistant Examiner* — Tom V Sheng
(74) *Attorney, Agent, or Firm* — Cantor Colburn LLP (57) ABSTRACT

An apparatus and method for searching and displaying data are provided. The method includes a scroller having a plurality of touch pads, a memory for storing the data, a controller for obtaining a first memory area of the memory in which data to be displayed are stored, and then sequentially displaying the data of the first memory area when the data to be displayed are selected, as well as obtaining a second memory area within the first memory area corresponding to a position of a touched touch pad and then sequentially displaying data of the second memory area when the touch pad is touched for more than a pre-determined time, and obtaining a scroll direction based on the position of the touched touch pad and then scrolling the screen in the obtained scroll direction when the touch pad is touched for less than the pre-determined time, and a user interface for enabling a user can to select the data to be displayed or request a memory mapping operation, and displaying or scrolling the data on a screen under control of the controller.

30 Claims, 10 Drawing Sheets

FOREIGN PATENT DOCUMENTS

| | | |
|---|---|---|
| JP | 08-305617 | 11/1996 |
| JP | 09-091115 | 4/1997 |
| JP | 11-083523 | 3/1999 |
| JP | 11-231989 | 8/1999 |
| JP | 2000-082048 | 3/2000 |
| JP | 2001-042991 | 2/2001 |
| JP | 2001-356755 | 12/2001 |
| KR | 1020020066434 | 8/2002 |
| TW | 233041 B | 5/2005 |
| TW | 248015 B | 1/2006 |
| TW | 255417 B | 5/2006 |

OTHER PUBLICATIONS

Taiwan Office Action; Feb. 25, 2009; Taiwan Application No. 95119530.

Japanese Office Action—Japanese Application No. 2007-552063 issued May 18, 2010, citing the prior art references being submitted herewith.

International Search Report PCT/KR2006/000218; Feb. 8, 2006.

Written Opinion PCT/KR2006/000218; Feb. 8, 2006.

International Preliminary Report on Patentability; May 10, 2007.

* cited by examiner

APPARATUS AND METHOD FOR SEARCHING AND DISPLAYING DATA

TECHNICAL FIELD

The present invention relates to an apparatus and method for searching and displaying data, and more particularly, to an apparatus and method for searching and displaying data that are capable of rapidly and simply searching and displaying a large volume of data by the use of a plurality of touch pads.

BACKGROUND ART

Figure 1:
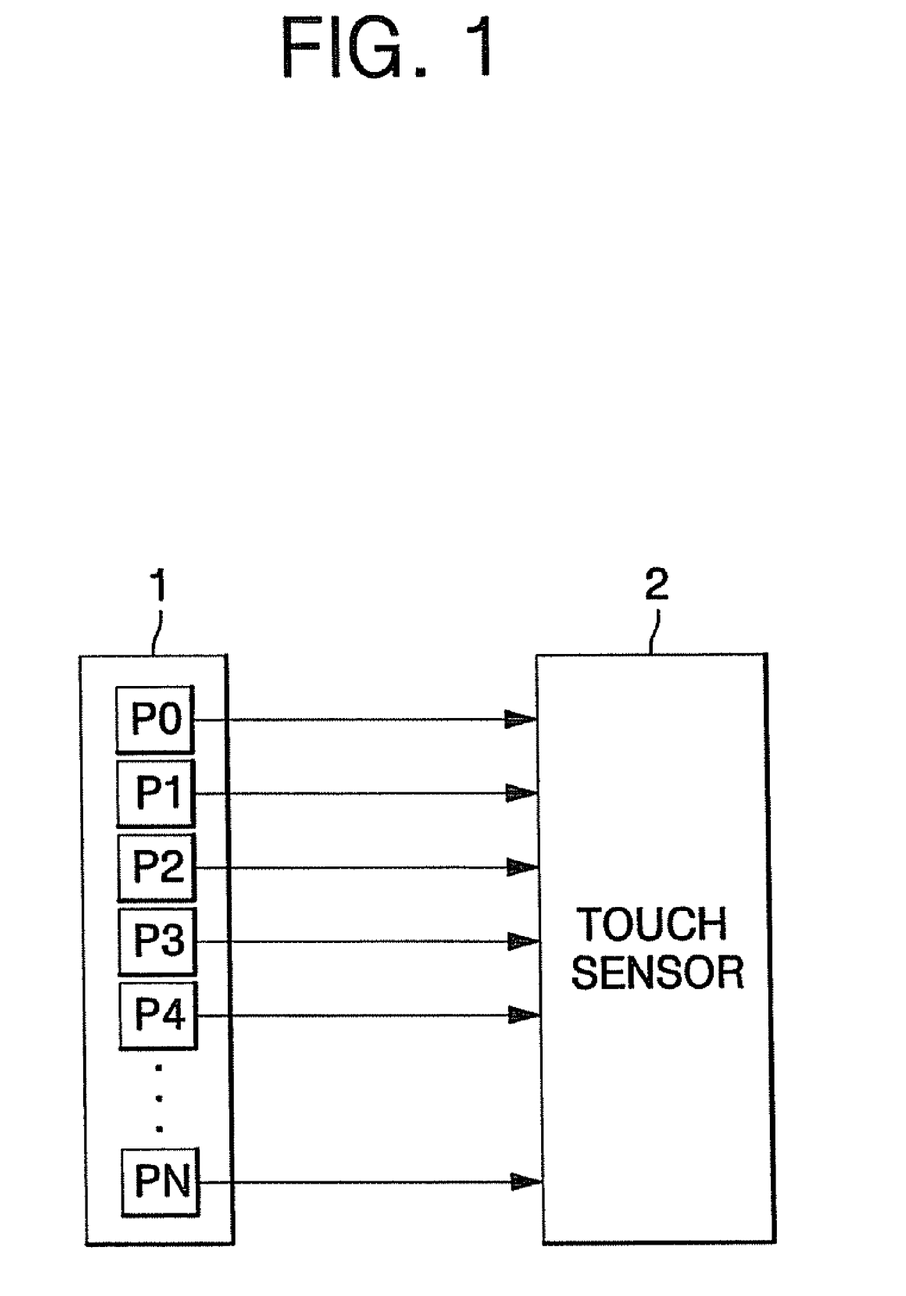
FIG. 1 shows a conventional scroll device.

In general, portable data search and display apparatuses, such as MP3 (short for MPEG-1 or 2 Audio, Layer 3) players, electronic dictionaries, mobile phones etc., are each equipped with a scroll device like FIG. 1. The scroll device enables any user to search and select desired data.

FIG. 1 shows a conventional scroll device having a plurality of touch pads 1 consisting of touch pads P0 to PN and a touch sensor 2 connected with them.

As shown in FIG. 1, the touch pads P0 to PN are vertically arranged in a row.

Each touch pad generates a resistance or capacitance at the touch of a user's finger. Thereby, the plurality of touch pads relay information based on the user's contact.

The touch sensor 2 is connected to the plurality of touch pads 1 and generates data corresponding to a position on the touch pad where the resistance or capacitance is generated, which is the position where the user touches the touch pad.

The scroll device of FIG. 1 is applied to a conventional data search and display apparatus. The conventional data search and display apparatus analyzes data output from the scroll device to scroll a display screen up when the user touches anywhere on the upper half of the row of touch pads P0 to PN and down when the user touches anywhere on the lower half of the touch pads P0 to PN.

In this manner, the conventional data search and display apparatus performs a scroll operation using the scroll device.

Meanwhile, data search and display apparatuses are gradually increasing in a storage capacity. Hence, when searching for desired data using the scroll device, there is a need for more frequent scroll operations.

For example, assuming that the data search and display apparatus is a hard disc type MP3 player in which about 10,000 pieces of music are stored, one line is required for the title of a piece of music, and the data search and display apparatus can display 10 lines at a time, 1,000 scroll operations are required to search through the music from start to finish.

Therefore, as the storage capacity of data search and display apparatuses increases, so does the need for a new type of data searching method.

To this end, the present invention is directed to an apparatus and method for searching and displaying data, in which any user can rapidly and easily search for desired data using a scroll device having a plurality of touch pads.

DISCLOSURE OF INVENTION

Technical Problem

It is an object of the present invention to provide an apparatus and method for searching and displaying data that are capable of rapidly and simply searching and displaying a large volume of data by mapping memory areas to a plurality of touch pads.

Technical Solution

According to an aspect of the present invention, there is provided an apparatus for searching and displaying data. The apparatus includes: a scroller having a plurality of touch pads; a memory for storing the data; a controller for obtaining a first memory area of the memory in which data to be displayed are stored, and then sequentially displaying the data of the first memory area when the data to be displayed are selected, as well as obtaining a second memory area within the first memory area corresponding to a position of a touched touch pad and then sequentially displaying data of the second memory area when the touch pad is touched for more than a pre-determined time, and obtaining a scroll direction based on the position of the touched touch pad and then scrolling the screen in the obtained scroll direction when the touch pad is touched for less than the pre-determined time; and a user interface for enabling a user can to select the data to be displayed or request a memory mapping operation, and displaying or scrolling the data on a screen under control of the controller.

According to another aspect of the present invention, there is provided a method for searching and displaying data by use of an apparatus having a plurality of touch pads and a storage device for storing the data of a plurality of files in a plurality of respective memory areas. The method includes: a displaying step of, when data to be displayed are selected, obtaining a first memory area in which the data to be displayed are stored, and sequentially displaying the data of the first memory area on a screen; a for memory mapping operation step of, when at least of the touch pads is touched for a pre-determined time or more, obtaining a second memory area corresponding to a position of the touched touch pad within the first memory area, and sequentially displaying a data of the second memory area on the screen; and a scrolling step of, when the at least one touch pad is touched for the pre-determined time or less, obtaining a scroll direction corresponding to the position of the touched touch pad, and scrolling the screen in the obtained scroll direction.

Advantageous Effects

According to the apparatus and method for searching and displaying data, when the position information of the specified memory area is mapped to each of the plurality of touch pads, and when the specified touch pad of the plurality of touch pads is touched for a predetermined time, the data read-out position for display is allowed to move to the memory area mapped to the specified touch pad. Thereby, it is possible to rapidly and conveniently search and display a large volume of data.

BRIEF DESCRIPTION OF THE DRAWINGS

The above and other features and advantages of the present invention will become more apparent to those of ordinary skill in the art by describing in detail preferred embodiments thereof with reference to the attached drawings in which.

BEST MODE FOR CARRYING OUT THE INVENTION

The present invention will now be described more fully with reference to the accompanying drawings, in which preferred embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art.

Figure 2:
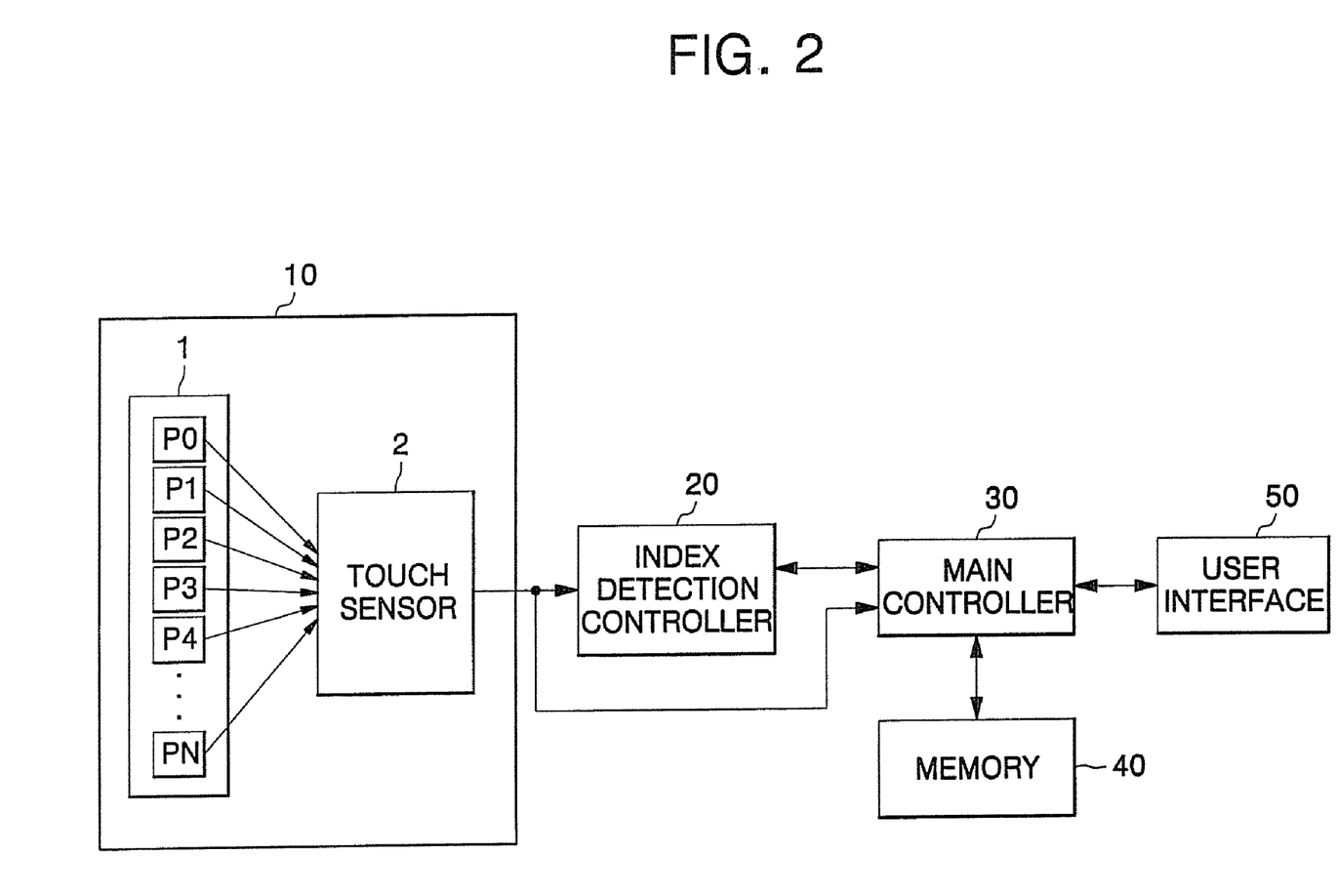
FIG. 2 is a block diagram showing an apparatus for searching and displaying data in accordance with the present invention.

Referring to FIG. 2, a data search and display apparatus of the present invention includes a scroller 10, an index detection controller 20, a main controller 30, a memory 40, and a user interface 50. The scroller 10 is composed of a plurality of touch pads 1 and a touch sensor 2.

The function of each constituent is described below.

Figure 3A:
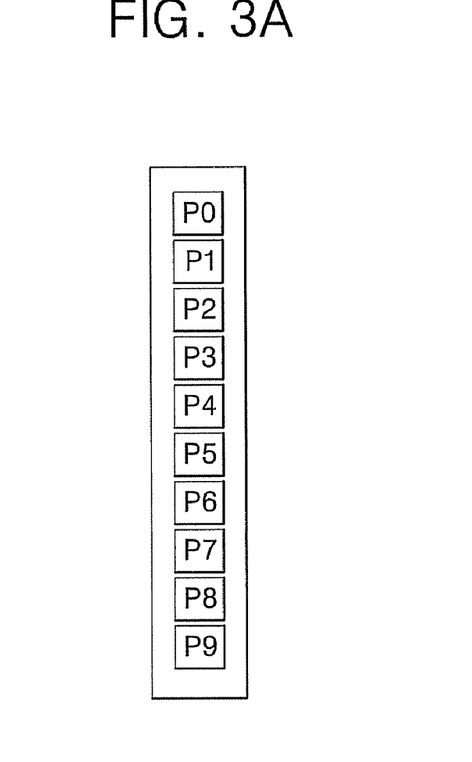
FIG. 3A-3E shows examples of a scroll device employed in the data search and display apparatus of FIG. 2.
Figure 3B:
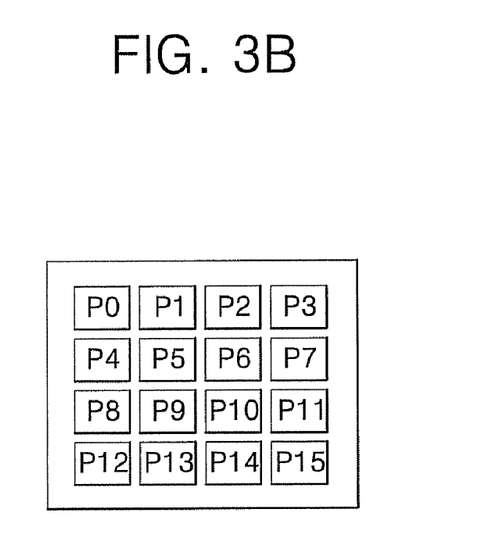
Figure 3C:
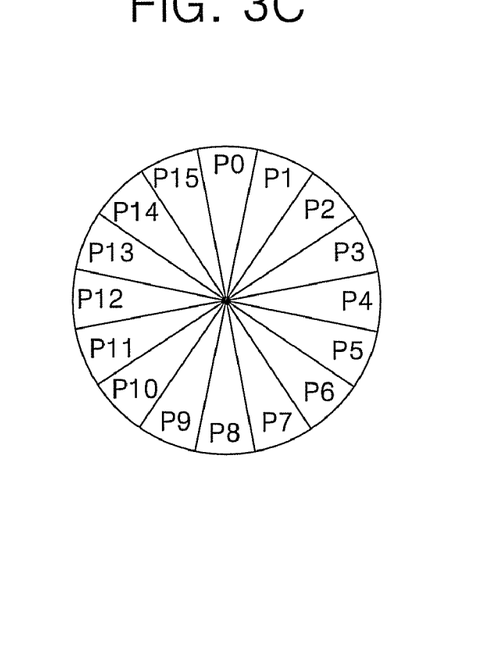

The scroller 10 generates data corresponding to a position on the touch pads 1 touched by a user. The plurality of touch pads 1 consists of individual touch pads P0 to PN arranged in various patterns such as shown in FIG. 3A to FIG. 3C. Each touch pad P0 to PN generates a predetermined resistance or capacitance when touched and remains in an idle state when not touched. The touch sensor 2 is connected with the plurality of touch pads 1, senses the resistance or capacitance of each touch pad P0 to PN to detect a position of the user's touch, and generates data corresponding to the detected touch position.

Figure 3D:
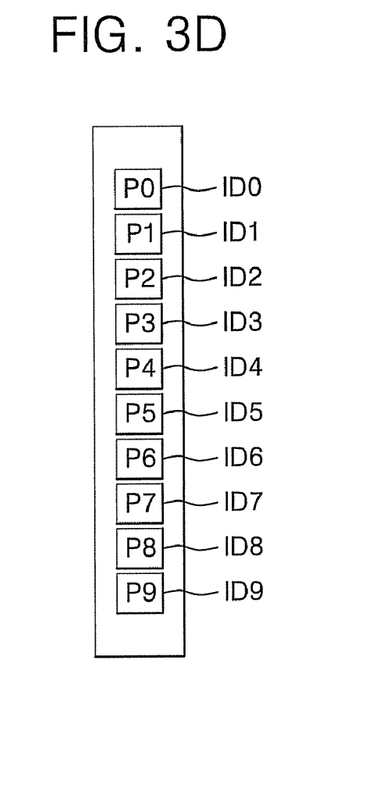
Figure 3E:
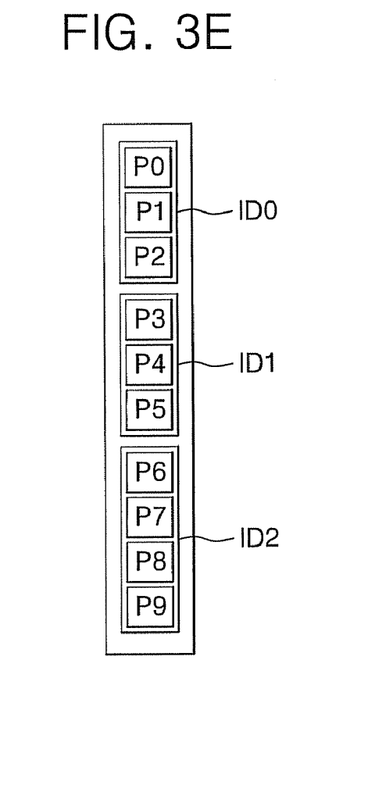

At initialization, the index detection controller 20 receives a number of indexes, and a "mapping operation request time," classifies the plurality of touch pads into a plurality of touch pad groups on the basis of the number of indexes, as in of FIG. 3D to FIG. 3E, and maps the indexes to the touch pad groups. After initialization, the index detection controller 20 analyzes data of the touch sensor 2, and if the analysis results indicate that the user touches a specific touch pad group for a length of time equal to or greater than the "mapping operation request time", the index detection controller 20 detects the index mapped to the specific touch pad group, and provides the detected index to the main controller 30.

In here, the "mapping operation request time" is a minimum time for which the user must continuously touch the touch pad in order to make a request for memory mapping operation, and is set by the user.

Further, the index detection controller 20 performs the memory mapping operation unconditionally when notified by the user interface 50 that the user makes a request for the memory mapping operation. In other words, although the time when the user contacts the specific touch pad is shorter than the "mapping operation request time", the index detection controller 20 detects the index mapped to the specific touch pad, and provides the detected index to the main controller 30.

The main controller 30 controls overall operation of the constituents, thereby performing work as in response to user commands and manipulation. More particularly, the main controller 30 sets the number of indexes and the "mapping operation request time" at initialization, and when data to be displayed after initialization are selected, detects a position of a first memory area where the data to be displayed is stored, and then reads out and outputs the data from a start position of the first memory area.

Here, when the data to be displayed are names of a predetermined number of files, the main controller 30 obtains a predetermined number of index memory areas IMAI and IMAJ where index information on the predetermined number of files is stored in the first memory area. When the data to be displayed is data of a specific file, the main controller 30 obtains a data memory area DMAI where the data of the specific file is stored.

And, the main controller 30 additionally obtains an index offset by dividing the size of the first memory area by the number of indexes. Then, when the index is received from the index detection controller 20, for memory mapping operation is performed using the index and index offset. In other words, the main controller 30 detects a second memory area that corresponds to the touched touch pad group using the index and index offset, obtains the data from the start position of the second memory area, and outputs the obtained data to the user interface 50. In contrast, when only data of the scroller 10 is received, the main controller 30 analyzes the received data, obtains a scroll direction that corresponds to the position of each touched touch pad, and scrolls a displayed screen in the obtained direction. Scrolling according to the data of the scroller 10 is based on a well-known technique and thus will not be described.

The index of the index detection controller 20 has a priority than the data of the scroller 10. Thus, when the index of the index detection controller 20 and the data of the touch sensor 2 are received at the same time, the main controller 30 first performs for memory mapping operation based on the index of the index detection controller 20.

Figure 4:
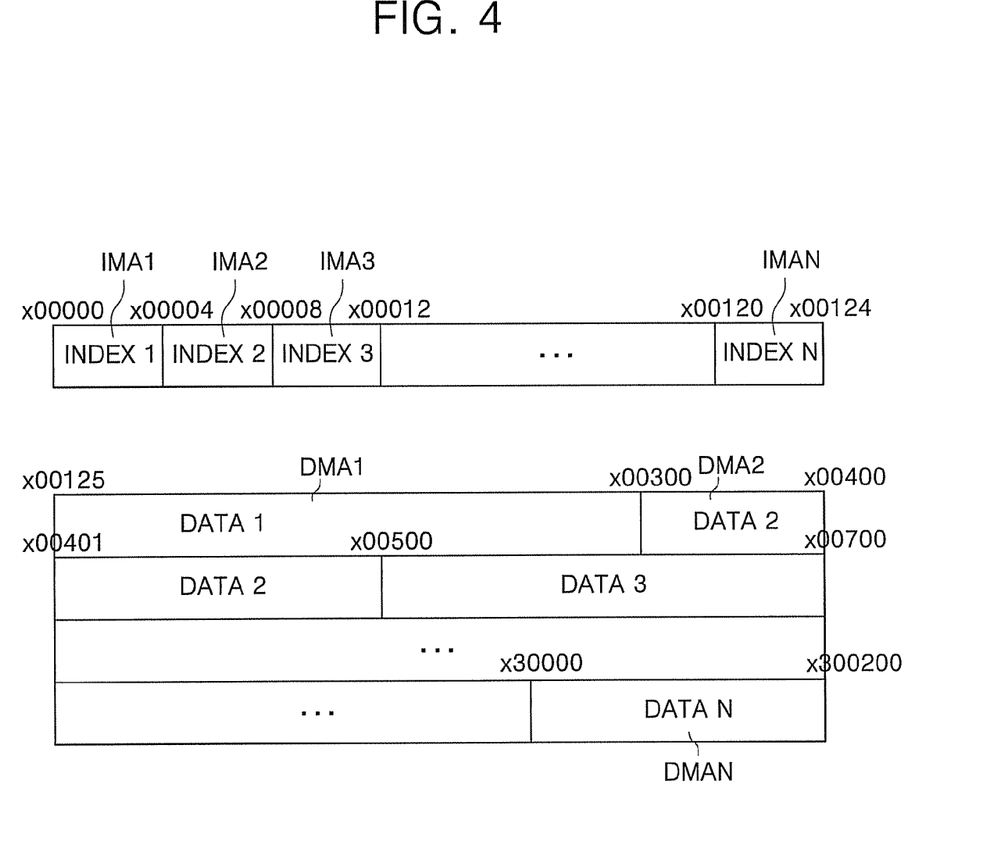
FIG. 4 shows memory areas of a memory of FIG. 2 in detail.

The memory 40 divides an entire memory area into a plurality of index memory areas IMA1 to IMAN and a plurality of data memory areas DMA1 to DMAN, as shown in FIG. 4. Index information index1 to indexN of files are stored in the plurality of index memory areas IMA1 to IMAN, respectively, whereas files data data1 to dataN are stored in the plurality of data memory areas DMA1 to DMAN, respectively.

The plurality of index memory areas IMA1 to IMAN have the same size, and the index information index1 to indexN stored in the index memory areas IMA1 to IMAN respectively includes the name of the corresponding file, start and end addresses of the memory area where the data of the corresponding file is stored, and so on.

The user interface 50 is composed of a user output mean such as a monitor and a speaker, and an input means such as a button and a switch. The user output converts and outputs the data received from the main controller 30 as audio or video. When the user selects a specific button or switch, the input mean senses the selection and notifies the main controller 30 or index detection controller 20. Specifically, the input mean enables a user to request an operation (e.g., for memory mapping operation) and set the number of indexes and the index offset.

FIG. 3A to FIG. 3E shows examples of a scroll device employed in the data search and display apparatus of FIG. 2.

In FIG. 3A shows a plurality of touch pads for vertical scrolling, FIG. 3B shows a plurality of matrix arrangement type touch pads for horizontal scrolling, FIG. 3C shows a plurality of circle arrangement type touch pads for vertical scrolling, FIG. 3D shows the touch pads of FIG. 3A grouped into 10 touch pad groups corresponding to 10 indexes ID0 to ID9, and FIG. 3E shows the touch pads of FIG. 3A grouped into three touch pad groups based on three indexes ID0 to ID2.

In this manner, the present invention may employ any one of the various scroll devices as shown in FIG. 3A to FIG. 3C, or some other modified scroll device. Also, the number of touch pad groups may be changed based on the number of indexes as shown in FIG. 3D and FIG. 3E.

The example shown in FIG. 3D is suitable for a case where an interval between the touch pads is very wide, or there is a need for many indexes ID0 to ID9. The example shown in FIG. 3E is suitable for a case where an interval between the touch pads is very narrow making it difficult to select any one of the touch pads, or there is a need for small indexes ID0 to ID2.

Further, while not shown in the drawings, it should be clear that the touch pads shown in FIG. 3B and FIG. 3C may be changed based on the number of indexes.

Besides, when the touch pads are arranged in a form other than a linear form as shown in FIG. 3B and FIG. 3C, some of them may be used for memory mapping operation and others for some other operation.

For example, the touch pads P0, P4, P8 and P12 that are vertically arranged as shown in FIG. 3B may be used for memory mapping operation and the others may be used for adjusting scroll speed.

In addition, the touch pads P15, P0, P1, P7, P8 and P9 that are vertically arranged as shown in FIG. 3C may be used for memory mapping operation and the others, P2 to P6 and P10 to P14, may be used for adjusting scroll speed.

Figure 5:
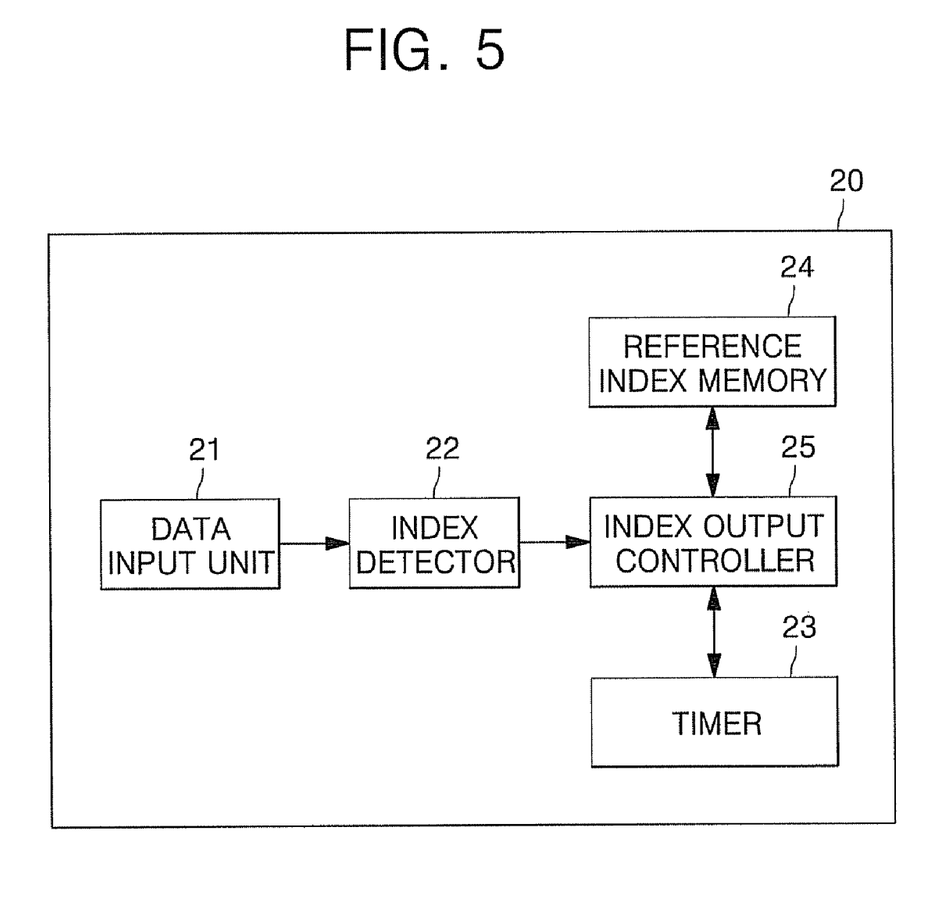
FIG. 5 is a block diagram showing the detailed construction of an index detection controller of FIG. 2.

FIG. 5 is a block diagram showing the detailed construction of the index detection controller 20 of the data search and display apparatus of FIG. 2. As shown, the index detection controller 20 includes a data input unit 21, an index detector 22, a reference index memory 24, a timer 23, and an index output controller 25.

The function of each block of FIG. 5 is described below.

The data input unit 21 classifies the plurality of touch pads P0 to PN into a plurality of touch pad groups based on the number of indexes received from the main controller 30, receives and analyzes data of the touch sensor 2, and senses the touched touch pad group.

If the number of touched touch pad groups that the user contact is two or more, the data input unit 21 selects the one of the touched touch pad groups that has the largest number of the touched touch pads. However, if the two or more touched touch pad groups have the same number of touched touch pads, the data input unit 21 processes it as an error or randomly selects any one of them according to the selection of the user.

When the plurality of touch pads are classified as the plurality of touch pad groups by the data input unit 21, the index detector 22 maps the plurality of indexes to the plurality of touch pad groups by one to one. When any one of the plurality of touch pad groups is selected by the data input unit 21, the index detector 22 detects the index mapped to the selected touch pad group. The timer 23 calculates the lapse of time and the timer 23 resets the calculated time whenever the reference index is updated or the index controller 25 outputs the detected index, and the reference index memory 24 stores a reference index.

When the index detected by the index detector 22 is the same as the reference index for a "mapping request time" or more, the index output controller 25 outputs the detected index to the main controller 30, and then resets the timer 23.

In contrast, when the detected index and the reference index are the same for less time than the "mapping operation request time", the index output controller 25 stores the detected index as the reference index and then resets the timer 23.

Operation of a data search and display apparatus according to the present invention will now be described with reference to FIG. 6.

At initialization, the main controller 30 sets a number of indexes and a "mapping operation request time" by request of a user, and the index detection controller 20 maps the set number of indexes to a plurality of touch pads (S1).

After initialization, the main controller 30 provides a menu so as to enable the user to select data to be displayed, obtains a first memory area where the data to be displayed are stored when the data to be displayed are selected, and sequentially displays the data of the first memory area (S2).

Then, the main controller 30 divides the first memory area based on the number of indexes set in step S1 and obtains an index offset (S3).

In this state, when the user touches at least one of the touch pads P0 to PN (S4), the touch sensor 2 generates data having position information on the touched touch pads P0 to PN (S5).

Then, when the index detection controller 20 ascertains that at least one of the touch pads P0 to PN is touched continuously for the "mapping operation request time," it detects an index mapped to the touched touch pad (S6).

The main controller 30 obtains a second memory area corresponding to the touched touch pad group using both the index detected in step S6 and the index offset obtained in step S3 (S7), and sequentially displays data of the second memory area on a screen (S8).

However, when the index is not detected in step S6, the main controller 30 analyzes data of the scroller 10, obtains a scroll direction, and scrolls a current screen in the obtained scroll direction (S9).

When steps S8 and S9 are completed, the main controller 30 checks whether overall operation is to be ended (S10). When it is determined that overall operation is to be ended, the main controller 30 terminates the operation of the data search and display apparatus. If not, the main controller 30 returns to step S4 and repeats a current operation.

In this manner, the data search and display apparatus of the present invention supports for memory mapping operation and the scrolling at the same time, thereby enables a user to search for specific files or information in a more rapid and convenient way.

Figure 6:
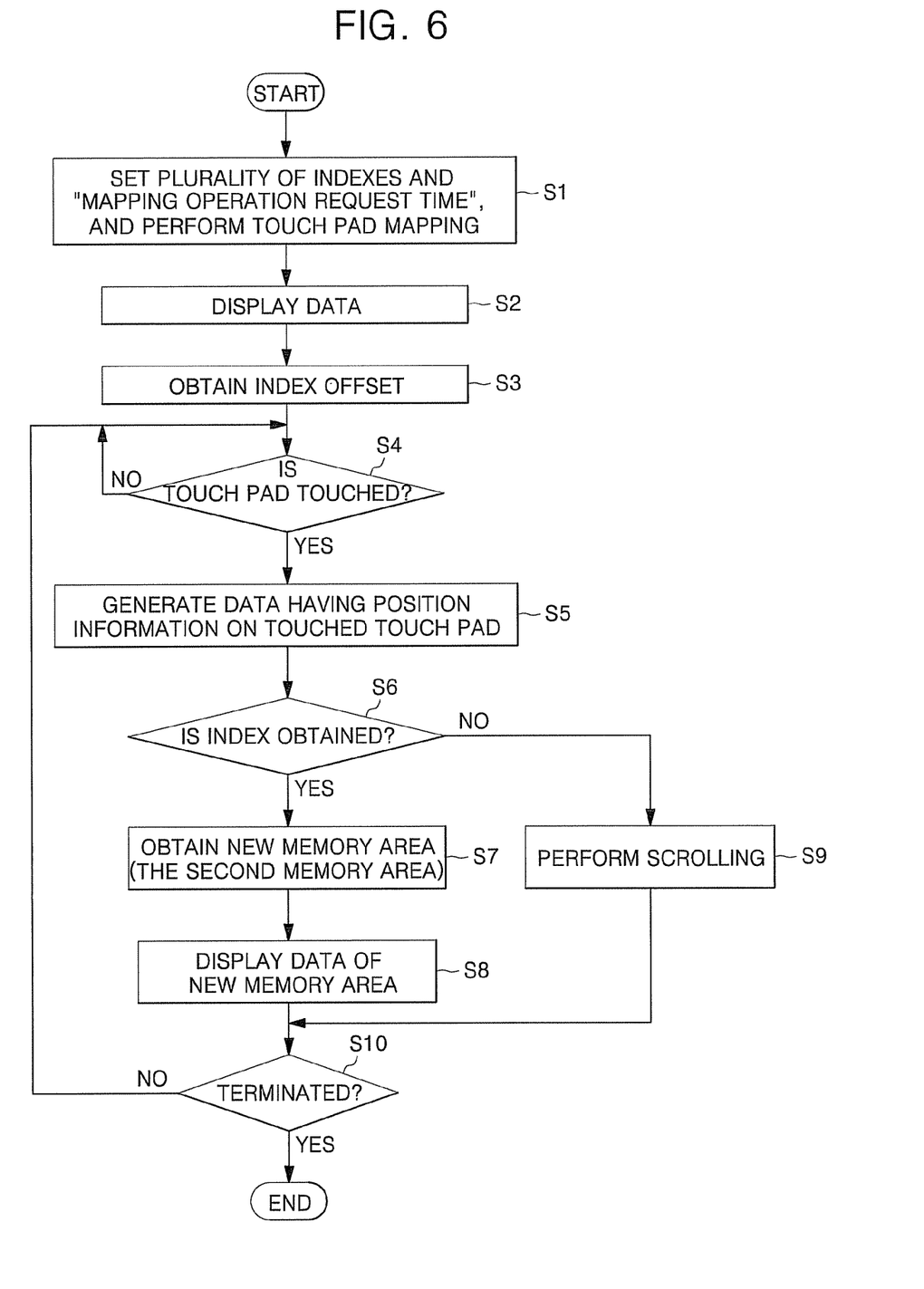
FIG. 6 is a flowchart of a method of searching and displaying data using a data search and display apparatus according to the present invention.
Figure 7:
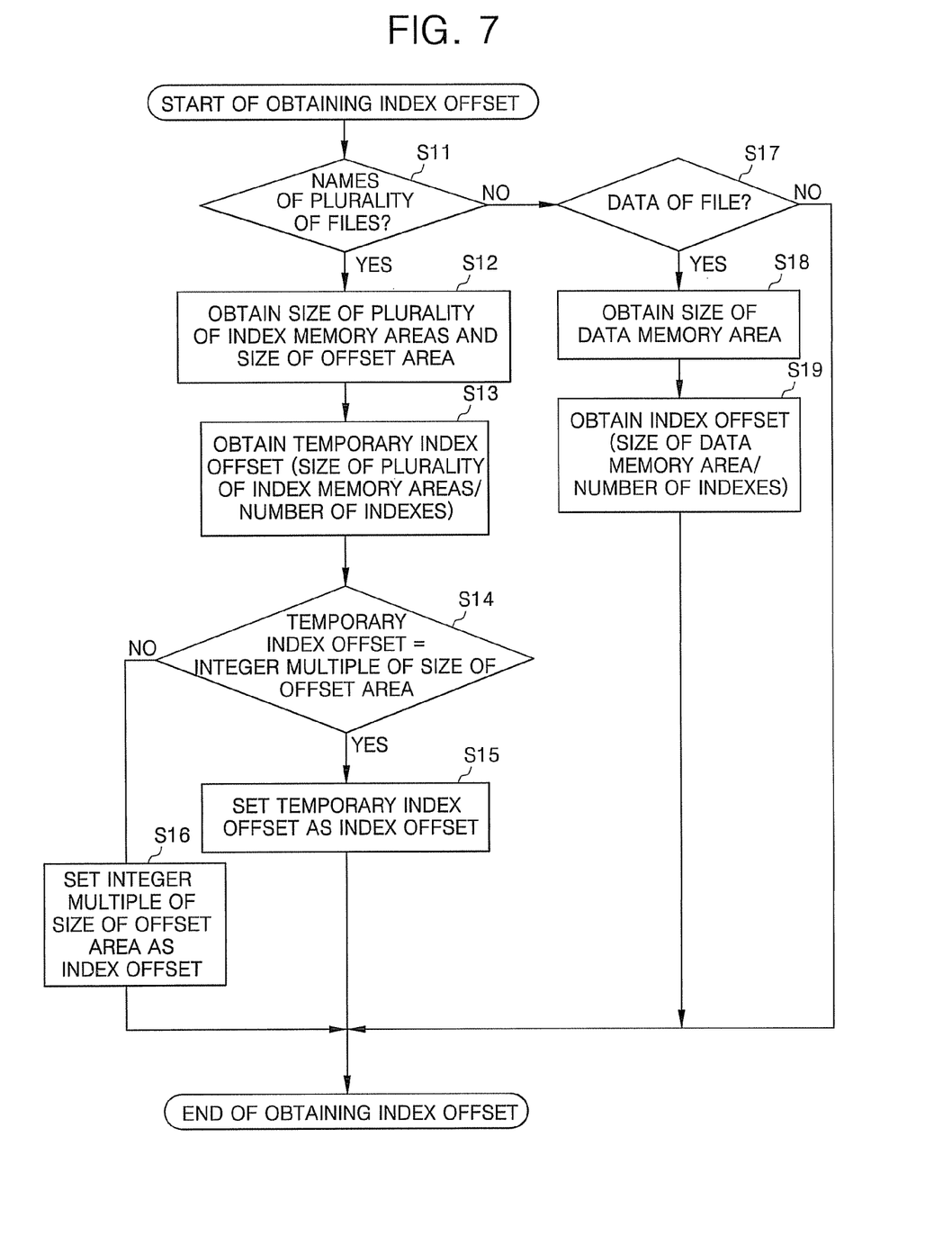
FIG. 7 is a flowchart showing a step of obtaining an index offset in the method of FIG. 6 in more detail.

FIG. 7 is a flowchart showing step S3 of obtaining an index offset in the method of FIG. 6 in more detail.

When the data to be displayed are names of a predetermined number of files (S11), the main controller 30 obtains a size of the predetermined number of index memory areas IMAI and IMAJ in which index information of the predetermined number of files are stored among the memory areas of the memory 40, and simultaneously, a size of one index memory area IMA1 (hereinafter, referred to as the size of a offset area) (S12).

The size of the plurality of index memory areas IMA1 to IMAN obtained in step S12 occupy is divided based on the number of indexes set in step S1 of FIG. 6 to obtain a temporary index offset (S13).

When the temporary index offset is an integer multiple of the size of the offset area obtained in step S12, the temporary index offset is set as the index offset (S15). If not, the integer multiple of the size of the offset area closest to the temporary index offset is set as the index offset (S16).

In contrast, when the data to be displayed are data of the file (S17), the size of the data memory area DMAI, in which the data of the file selected by the user is stored, is obtained (S18).

The size of the memory area obtained in step S18 is divided based on the number of indexes which set in step S1 of FIG. 6 and the index offset is obtained (S19).

Figure 8:
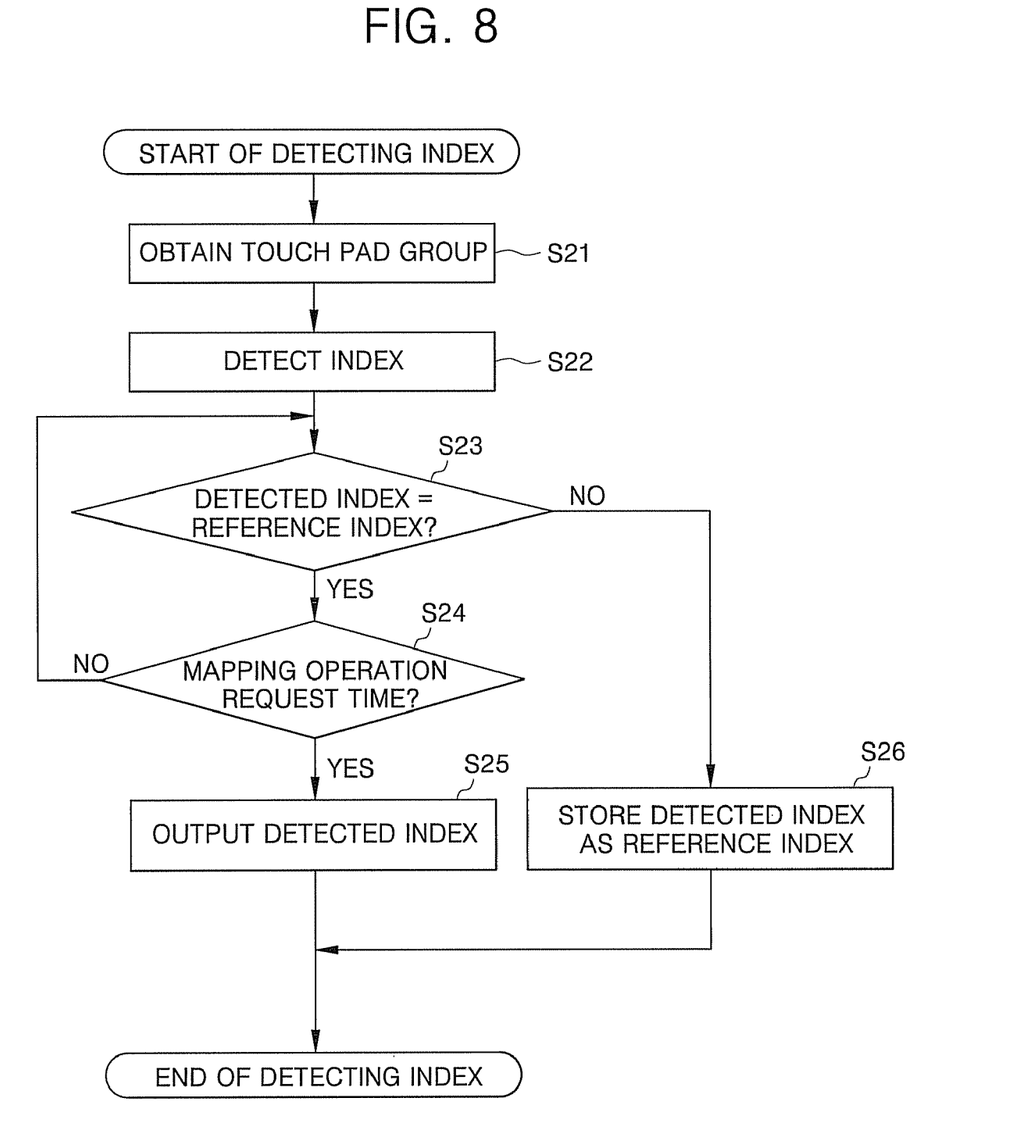
FIG. 8 is a flowchart showing a step of detecting an index in the method of FIG. 6 in more detail.

FIG. 8 is a flowchart showing step S6 of detecting an index in the method of FIG. 6 in more detail.

First, when receiving data of the touch sensor 2, the data input unit 21 analyzes the received data, detects at least one touched touch pad P0 to PN, and obtains a touch pad group to which the touched touch pads belong (S21).

When the touch pad group is obtained in step S21, the index detector 22 detects an index mapped to the obtained touch pad group (S22).

Then, the index output controller 25 checks whether the index detected in step S22 has the same value as a reference index (S23). When a state in which the detected index and the reference index have the same value is maintained for the "mapping operation request time" (S24), the detected index is transmitted to the main controller 30 and the timer 23 is reset (S25).

However, when the detected index has a value different from the reference index, or when the state in which the detected index and the reference index have the same value is not maintained for the "mapping operation request time", the detected index is stored as the reference index and the timer 23 is reset (S26).

Figure 9:
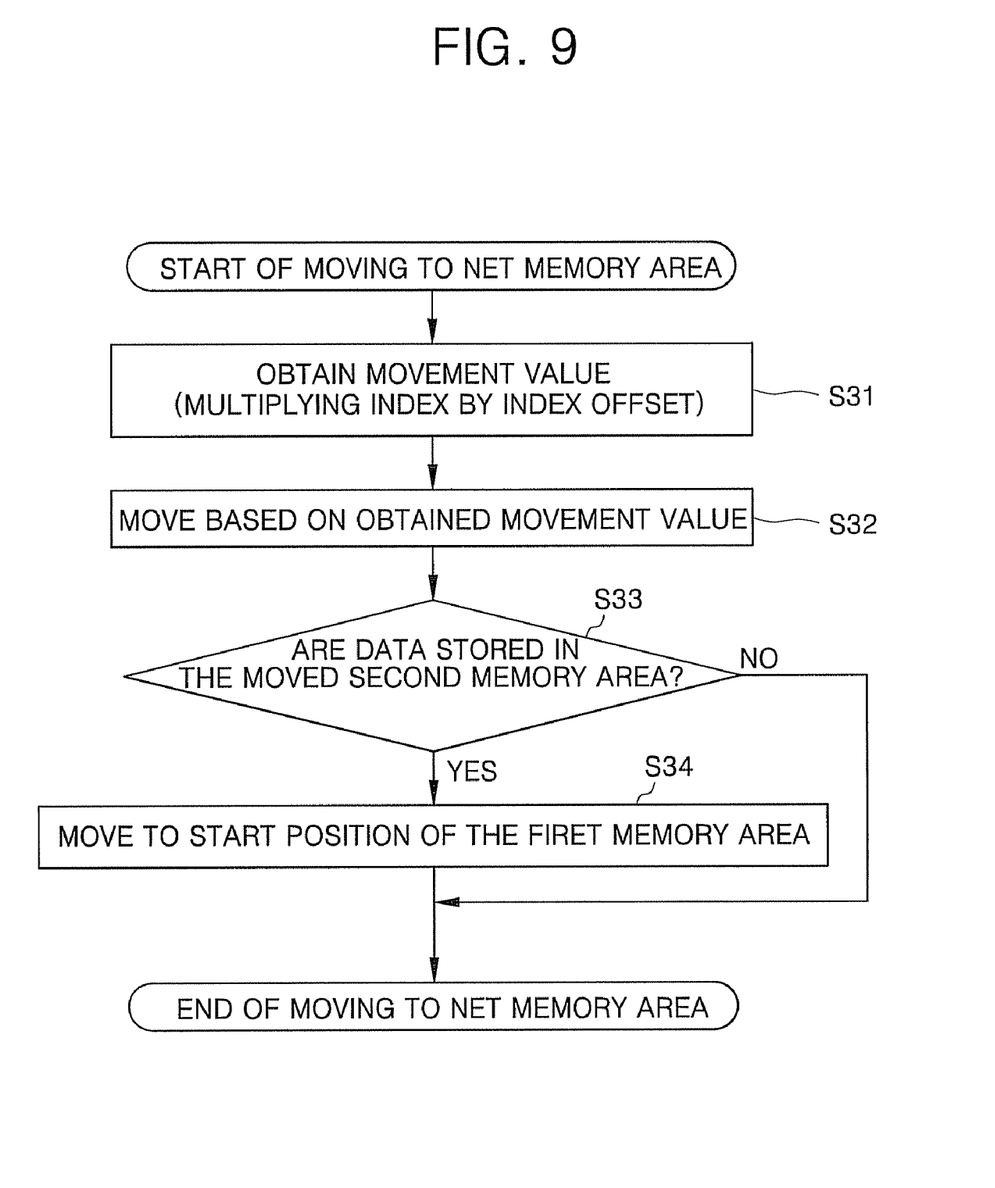
FIG. 9 is a flowchart showing a step of moving to a new memory area in the method of FIG. 6 in more detail.

FIG. 9 is a flowchart showing step S7 of moving to a second memory area in the method of FIG. 6 in more detail.

The main controller 30 multiplies the index detected in step S6 of FIG. 6 by the index offset obtained in step S3 of FIG. 6, thereby obtaining a movement value (S31).

Thus, a data read-out position for display of the main controller 30 moves from the start position of the first memory area obtained in step S2 of FIG. 6 by the movement value obtained in step S31, namely to a second memory area (S32). It is checked whether data are stored in the moved second memory area (S33).

As a result of checking in step S33, if the data are not stored in the moved second memory area, the data read-out position for display moves to the start position of the first memory area again (S34). If the data are stored in the moved second memory area, the main controller 30 determines that the data read-out position for display normally moves to the second memory area, and proceeds to step S8 of FIG. 6.

In the exemplary embodiment shown in FIG. 9, it is described that, when there is no data in the moved memory area, the data read-out position for display moves to the start position of the first memory area in which the data to be displayed are stored. However, it should be clear that the data read-out position for display can move to the end position of the first memory area or an arbitrary position within the first memory area as needed by the user.

The foregoing description concerns an embodiment where the data read-out position for display moves to a specified memory area when at least one touch pad is touched. In alternative embodiments, some other specified operation may be performed when at least one touch pad is touched according to the same principle of the present invention.

When the plurality of touch pads of the present invention are grouped into the touch pad groups as shown in FIG. 3D and FIG. 3E, for memory mapping operation may be performed using some of the touch pad groups, and some other specified operation may be performed using others.

Further, it should be clear that the user can directly set at least one touch pad and specified memory area corresponding to each identifier (ID) as needed by the user.

The forgoing description concerns an exemplary embodiment of the invention, is intended to be illustrative, and should not be construed as limiting the invention. The present teachings can be readily applied to other types of devices and apparatuses. Many alternatives, modifications, and variations within the scope and spirit of the present invention will be apparent to those skilled in the art.

The invention claimed is:

1. An apparatus for searching and displaying data, comprising:
    a scroller having a plurality of touch pads;
    a memory for storing the data;
    a controller for sequentially reading and outputting display data from a start position of a first memory area of the memory in which data to be displayed are stored when the data to be displayed are selected, as well as sequentially reading and outputting display data from a start position of a second memory area within the first memory area corresponding to a position of a touched touch pad when the touch pad is touched for more than a pre-determined time, and obtaining a scroll direction based on the position of the touched touch pad and then scrolling a screen in the obtained scroll direction when the touch pad is touched for less than the pre-determined time; and
    a user interface for enabling a user to select the data to be displayed or request a memory mapping operation, and displaying the data to be displayed or scrolling the screen under control of the controller,
    wherein the controller includes:
    an index detection controller for mapping between a plurality of indexes and the plurality of touch pads, and when the touch pads are touched for the pre-determined time, detecting and outputting an index mapped to the touched touch pad; and
    a main controller for setting the pre-determined time and the plurality of indexes, obtaining an index offset based on the first memory area and the number of the indexes when data stored in the first memory area are selected as the data to be displayed, and determining the second memory area based on the detected index and the index offset to sequentially output the data of the second memory area when the index is received.

2. The apparatus as claimed in claim 1, wherein the controller sequentially displays the data of the second memory area corresponding to the position of the touched touch pad when the memory mapping operation is requested, even if the touch pad is not touched for more than the pre-determined time.

3. The apparatus as claimed in claim 1, wherein the index detection controller includes:
    a reference index memory for storing the detected index as a reference index;
    a timer for calculates the lapse of time;
    an index detector for mapping between the plurality of indexes and the plurality of touch pads and detecting the index mapped to the touched touch pad when the at least one touch pad is touched or when a request is made for the memory mapping operation through the user interface; and
    an index output controller for, when the detected index is the same as the reference index for the pre-determined time or more, or when a request is made for the memory mapping operation through the user interface, outputting the detected index and simultaneously resetting the timer, and when the detected index is the same as the reference index for less than the pre-determined time or when the detected index is different from the reference index, storing the detected index as the reference index and simultaneously resetting the timer.

4. The apparatus as claimed in claim 3, wherein the index output controller further outputs the detected index and simultaneously resets the timer, when the request is made for the memory mapping operation through the user interface.

5. The apparatus as claimed in claim 3, wherein the index detector classifies the plurality of touch pads into a plurality of touch pad groups based on the number of indexes and maps between the plurality of touch pad groups and the plurality of indexes.

6. The apparatus as claimed in claim 3, wherein the index detector outputs the index mapped to a more frequently touched touch pad with priority when two or more indexes mapped to touched touch pads are detected.

7. The apparatus as claimed in claim 1, wherein the memory includes:
a plurality of index memory areas, all having the same size, and each for storing index information; and
a plurality of data memory areas, each for storing data information on a file.

8. The apparatus as claimed in claim 7, wherein the index information includes a name of the file corresponding thereto, and information on start and end positions of the data memory area corresponding thereto.

9. The apparatus as claimed in claim 8, wherein the main controller determines the index memory areas in which the index information of a predetermined number of files is stored as the first memory area when the data to be displayed are the names of the predetermined number of files, and then obtains an integer multiple of the size of the index memory area that is similar or equal to the result of dividing the first memory area by the number of indexes as the index offset.

10. The apparatus as claimed in claim 8, wherein the main controller determines the data memory areas in which the data of the files are stored as the first memory area when the data to be displayed are the data of the files, and then obtains the result of dividing the first memory area by the number of indexes as the index offset.

11. The apparatus as claimed in claim 8, wherein the main controller is adapted to directly set a value of the index offset by request of the user.

12. The apparatus as claimed in claim 1, wherein the main controller determines an area, where a data read-out position moves corresponding to movement from a start position of the first memory area by the product of the index and the index offset as the second memory area.

13. The apparatus as claimed in claim 12, wherein the main controller determines the start position of the first memory area as the second memory area when there is no data stored in the second memory area.

14. The apparatus as claimed in claim 12, wherein the main controller determines an end position of the first memory area as the second memory area when there is no data stored in the second memory area.

15. The apparatus as claimed in claim 1, wherein the main controller is adapted to use manually settable index offset, by request of the user.

16. The apparatus as claimed in claim 1, wherein the main controller performs the memory mapping operation using a predetermined number of touch pads, and adjusts a scrolling speed using a predetermined number of touch pads.

17. The apparatus as claimed in claim 1, wherein the plurality of touch pads of the scroller are vertically arranged in a row.

18. The apparatus as claimed in claim 1, wherein the plurality of touch pads of the scroller are arranged in a matrix form.

19. The apparatus as claimed in claim 1, wherein the plurality of touch pads of the scroller are arranged in a circle.

20. The apparatus as claimed in claim 1, wherein the apparatus is portable.

21. A method for searching and displaying data by use of an apparatus having a plurality of touch pads and a storage device for storing the data of a plurality of files in a plurality of respective memory areas, the method comprising:
a mapping step of setting a pre-determined time and a plurality of indexes and mapping the plurality of touch pads to the plurality of indexes;
a displaying step of, when data to be displayed are selected, sequentially displaying on a screen display data from a start position of a first memory area in which the data to be displayed are stored;
a memory mapping operation step of, when at least one of the touch pads is touched for a pre-determined time or more, sequentially displaying on the screen display data from a start position of a second memory area corresponding to a position of the touched touch pad and corresponding index, the first memory area including the second memory area; and
a scrolling step of, when the at least one touch pad is touched for less than the pre-determined time, obtaining a scroll direction corresponding to the position of the touched touch pad, and scrolling the screen in the obtained scroll direction.

22. The method as claimed in claim 21, wherein the mapping operation step includes:
an index offset obtaining step of dividing the first memory area by the number of indexes to obtain an index offset;
an index detecting step of detecting the index corresponding to the touched touch pad; and
a second memory area obtaining step of obtaining the second memory area corresponding to the position of the touched touch pad within the first memory area using the detected index and the index offset.

23. The method as claimed in claim 22, wherein the index offset obtaining step includes the steps of, when the data to be displayed are names of the plurality of files:
obtaining a size of the entire memory area in which the names of the plurality of files are stored;
obtaining the value of dividing the size of the entire memory area by the number of indexes; and
obtaining an integer multiple of the size of the offset area that is similar or equal to the divided value as the index offset.

24. The method as claimed in claim 22, wherein the index offset obtaining step includes the steps of, when the data to be displayed are data of the file:
obtaining the value of dividing the memory area, in which the data of the files are stored, by the number of indexes; and
obtaining an integer multiple of the size of the offset area that is similar or equal to the divided value as the index offset.

25. The method as claimed in claim 22, wherein the index detecting step includes the steps of:
when the at least one touch pad is touched, detecting the index mapped to the touched touch pad;

when the detected index is the same as a reference index for the pre-determined time or more, outputting the detected index; and when the detected index is different from a reference index for the pre-determined time or more, setting the detected index as the reference index.

26. The method as claimed in claim 25, wherein the index detecting step, detecting the index mapped to the touched touch pad, selects the index mapped to more frequently touched touch pads with priority, when two or more indexes mapped to touched touch pads are detected.

27. The method as claimed in claim 25, wherein the index detecting step outputs, when a user makes a request for the for memory mapping operation, the detected index even when the detected index is the same as the reference index for the pre-determined time or less.

28. The method as claimed in claim 22, wherein the second memory determining step determines an area, where a data read-out position moves corresponding to movement from a start position of the first memory area by the product of the detected index and the index offset, as the second memory area.

29. The method as claimed in claim 22, wherein the second memory determining step determines a start position of the first memory area as the second memory area when there is no data stored in the second memory area.

30. The method as claimed in claim 22, wherein the second memory determining step determines an end position of the first memory area as the second memory area when there is no data stored in the second memory area.

* * * * *